Oct. 3, 1961 L. W. FERGUSON 3,002,310
SPECIAL CATFISH HOOK
Filed April 2, 1959 2 Sheets-Sheet 1
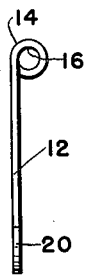
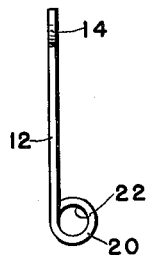
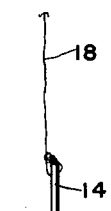
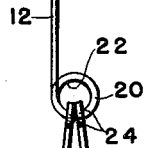
INVENTOR.
LESLIE W. FERGUSON Oct. 3, 1961  L. W. FERGUSON  3,002,310
SPECIAL CATFISH HOOK
Filed April 2, 1959  2 Sheets-Sheet 2
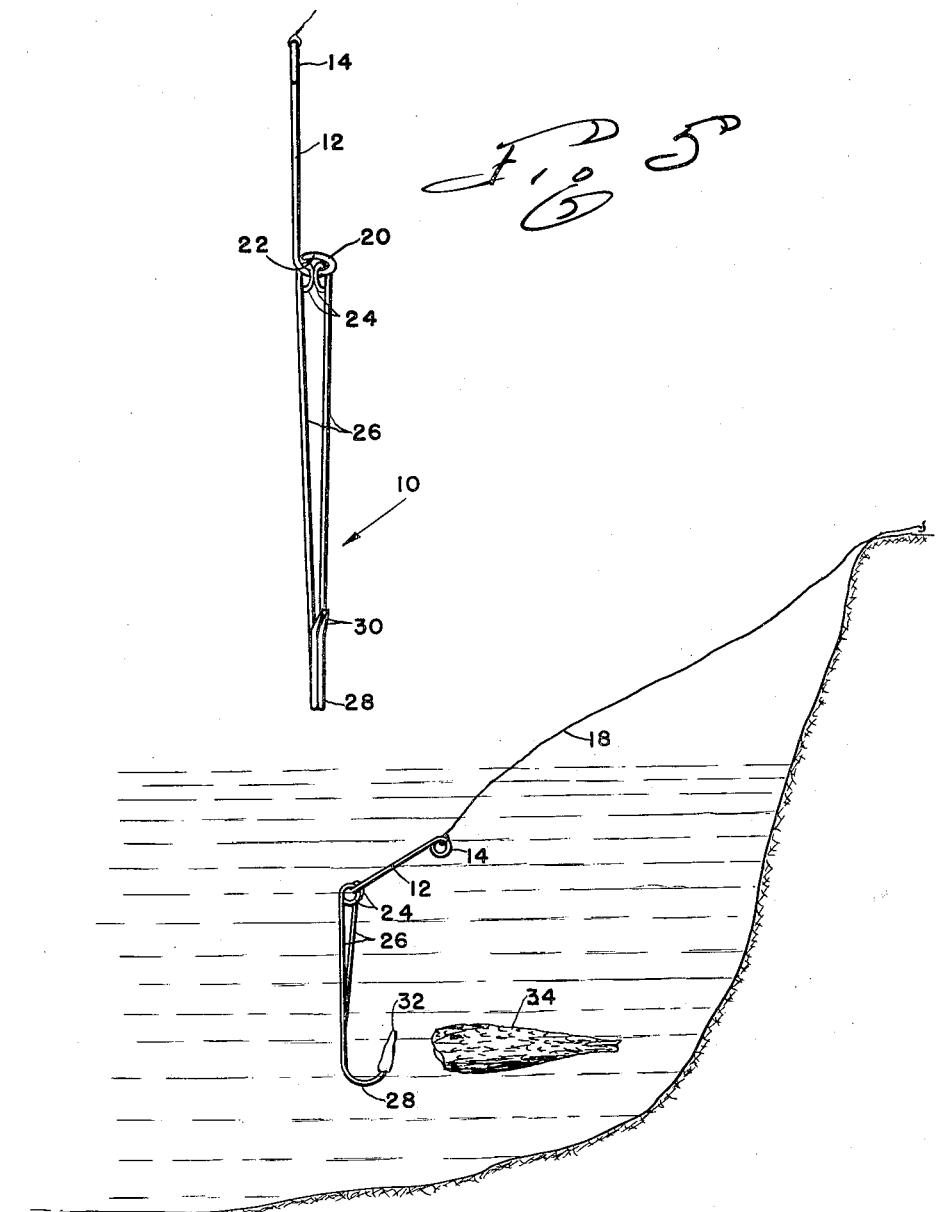
INVENTOR.
LESLIE W. FERGUSON

United States Patent Office 3,002,310
Patented Oct. 3, 1961

3,002,310
SPECIAL CATFISH HOOK
Leslie W. Ferguson, Smithwick, S. Dak.
Filed Apr. 2, 1959, Ser. No. 803,746
1 Claim. (Cl. 43—37)

This invention relates to fishing apparatus and more particularly to a fish hook.

It is an object of the present invention to provide a special catfish hook that is lever actuated for spreading the multiple barbs thereof into securing engagement within the mouth of the fish.

Another object of the present invention is to provide a self locking fish hook that includes a plurality of barbs which are normally disposed in side by side contact with each other so as to resemble a single barbed fish hook upon which the bait may be attached.

Still another object of the present invention is to provide a self locking catfish fish hook of the above type in which the multiple barbs thereof are spread further apart in response to a pulling force by the fish and a counter pulling force upon the fish line associated therewith.

Other objects of the invention are to provide a special catfish hook bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a front elevational view of a catfish hook made in accordance with the present invention in an open position;

FIGURE 2 is a side elevational view of a lever forming a part of the present invention;

FIGURE 3 is a front elevational view of a lever shown in FIGURE 2;

FIGURE 4 is a side elevational view of a single hook element forming another part of the present invention;

FIGURE 5 is a view similar to FIGURE 1, showing the hook in an initial closed position; and FIGURE 6 is a side elevational view of a fish hook made in accordance with the present invention in operative use.

Referring now more in detail to the drawing, and more particularly to FIGURES 1 to 4 thereof, a self locking catfish hook assembly 10 made in accordance with the present invention is shown to include a lever 12 having a loop 14 at one end for attachment to the end of a flexible fish line 18. The opposite end of the lever 12 has a ring 20 forming a loop 22 that lies in a plane substantially normal to the plane of the line fastener 14 at the opposite end.

A pair of substantially identical fish hooks, each having a shank 26 with an eye 24 formed at one end and a hook portion 28 formed at the opposite end with barbs 30, are supported by means of the eye loops 24 upon the ring 20 of the lever 12. As is more clearly shown in FIGURE 5 of the drawing, the loops 24 of the fish hook shanks 26 converge in a forward direction while the hooks 28 and barbs 30 are in substantially parallel side by side contacting relationship with each other. In this position, the lever 12 is retained in an angularly related position, as shown in FIGURE 6. With bait 32 secured to the barbs 30 of both fish hooks 28, the loops 24 tend to retain the lever 12 in the angularly related position. However, in response to a pull upon the line 18 and a pull upon the bait 32 by a fish 34, the lever 12 is rotated toward an axially aligned position relative to the shanks 26, thus forcing the barbs 30 and hooks 28 to the open position shown in FIGURE 1, because of the converging eye loops 24 and their associated engagement with the ring 20 of the lever. The spreading of the hook ends 28 thus tends to lock the barbs 30 more securely within the mouth of the fish, prevening the fish from escaping therefrom. The resulting leverage of the lever 12 upon the fish hooks, is thus multiplied by the tugging of the fish upon the hook, so that the hooks become more firmly entrenched as the fish increases its pull to escape.

The inner facing surfaces of the hook portion 28 and barbs 30 are flattened so that they will more closely fit together and resemble a single part hook. In a similar manner, the barbs 30 are offset in the same direction as shown in FIGURE 5, so that the hook in the normal position resembles a single part unit. This is extremely important in the case of fishing for catfish that are extremely reluctant to strike at a multi-part hook.

While various changes may be made in the detail construction, it shall be understood that such changes shall be within the spirit and scope of the present invention as defined by the appended claim.

What I claim as new and desire to protect by Letters Patent of the United States is:

A self locking fish hook comprising, in combination, a pair of similar fish hooks, each one of said fish hooks having an intermediate shank, and a barb at one end, a lever, fastening means securing one end of said lever to the opposite end of each of said fish hooks, said lever being in an initial position angularly related to the shanks of said fish hooks with said barbs being in lateral contact with each other, and twisting means associated with said one end of said lever and said fastening means for spreading said shanks and said barbs apart in response to relative movement between said lever and said shanks of said hooks toward axially aligned positions, said twisting means including a ring integral with said one end of said lever, said fastening means including a pair of loops, one integral with said opposite end of each of said fish hooks and in pivotal engagement with said ring, the opposite end of said lever including an eye lying in a plane substantially perpendicular to the plane of said ring at said one end thereof, said eye receiving one end of a flexible fishing line for attachment thereto, said shanks of said fish hooks converging in a direction toward said barbs in said initial position of said lever, and said loops of said fish hooks converging forwardly on the same side of said shanks as said barbs when in said initial position of said lever, whereby a pull upon the flexible line and a simultaneous pull upon said barbs tends to rotate said hooks and said lever toward alignment with each other, and rotation of said ring within said loops of fish hooks tends to spread said shanks and said barbs apart.

References Cited in the file of this patent

UNITED STATES PATENTS

| | | |
|---|---|---|
| 586,992 | Mills | July 27, 1897 |
| 986,747 | Olson | Mar. 14, 1911 |
| 2,350,650 | Titus | June 6, 1944 |
| 2,526,288 | Shields et al. | Oct. 17, 1950 |